(12) United States Patent
Han et al.

(10) Patent No.: US 10,737,683 B2
(45) Date of Patent: Aug. 11, 2020

(54) HYBRID VEHICLE AND METHOD FOR CONTROLLING THE SAME

(71) Applicants: HYUNDAI MOTOR COMPANY, Seoul (KR); KIA MOTORS CORPORATION, Seoul (KR)

(72) Inventors: Hoon Han, Hwaseong-si (KR); Joonyoung Park, Seoul (KR); Chun Hyuk Lee, Suwon-si (KR); In Eok Cho, Incheon (KR); Il Kwon Park, Seoul (KR); Jeamun Lee, Seoul (KR); Yong Kak Choi, Seoul (KR); Jae Yun Shim, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 393 days.

(21) Appl. No.: 15/796,427

(22) Filed: Oct. 27, 2017

(65) Prior Publication Data

US 2019/0001956 A1 Jan. 3, 2019

(30) Foreign Application Priority Data

Jun. 29, 2017 (KR) .......................... 10-2017-0082347

(51) Int. Cl.
*B60W 20/11* (2016.01)
*B60W 10/06* (2006.01)
*B60W 10/08* (2006.01)

(52) U.S. Cl.
CPC ............ *B60W 20/11* (2016.01); *B60W 10/06* (2013.01); *B60W 10/08* (2013.01); *B60W 2510/081* (2013.01); *B60W 2510/085* (2013.01); *B60W 2510/244* (2013.01); *B60W 2520/10* (2013.01); *B60W 2554/801* (2020.02); *B60Y 2200/92* (2013.01); *Y10S 903/93* (2013.01)

(58) Field of Classification Search
CPC ...... B60W 20/11; B60W 10/06; B60W 10/08; B60W 10/081; B60W 2510/085; B60W 2510/244; B60W 2520/10; B60W 2550/308; B60W 30/00; B60W 30/18; B60W 30/18009; B60W 30/18027; B60W 30/182; B60W 30/188; B60W 30/1882; B60W 30/192; B60W 20/00; B60W 20/10; B60W 20/13; B60W 20/15; B60W 20/19; B60W 20/20; Y10S 903/93; B60Y 2200/92; F02N 11/00
USPC ......................................................... 701/22
See application file for complete search history.

(56) References Cited

U.S. PATENT DOCUMENTS 6,755,266 B2 * 6/2004 Lasson .................. B60W 20/10
180/65.235

\* cited by examiner

*Primary Examiner* — Anthony R Jimenez
(74) *Attorney, Agent, or Firm* — Morgan, Lewis & Bockius LLP

(57) ABSTRACT

A method for controlling a hybrid vehicle having a motor and an engine includes: calculating a first startup reference value of the engine on the basis of requested power of the hybrid vehicle; measuring a current speed of the hybrid vehicle, and predicting a future speed of the hybrid vehicle; generating a compensation value needed to compensate for the first startup reference value of the engine on the basis of a difference between the current speed and the future speed of the hybrid vehicle; acquiring a second startup reference value of the engine by compensating for the first startup reference value on the basis of the compensation value; and controlling a startup operation of the engine according to the second startup reference value acquired through compensation.

20 Claims, 9 Drawing Sheets

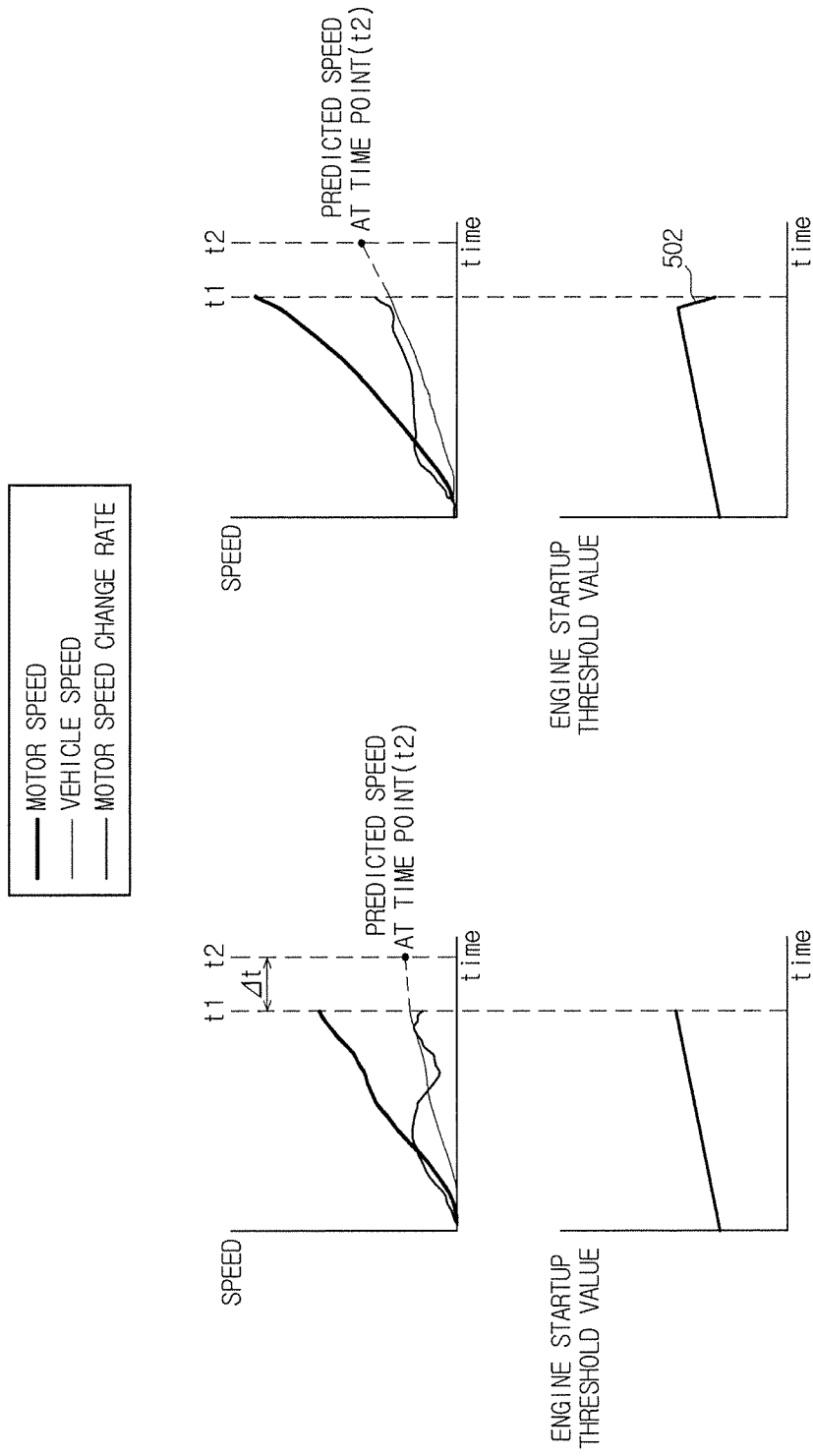

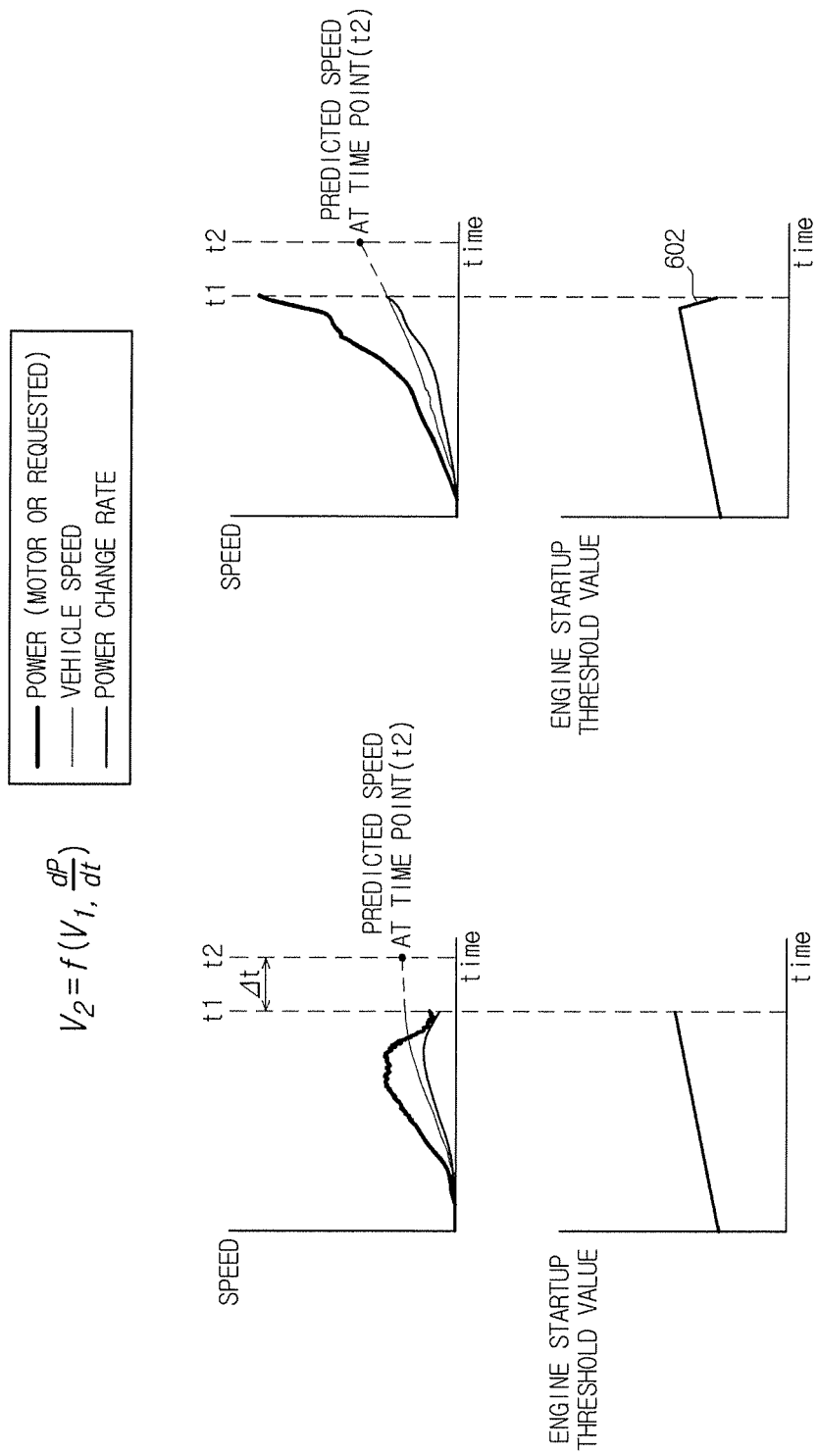

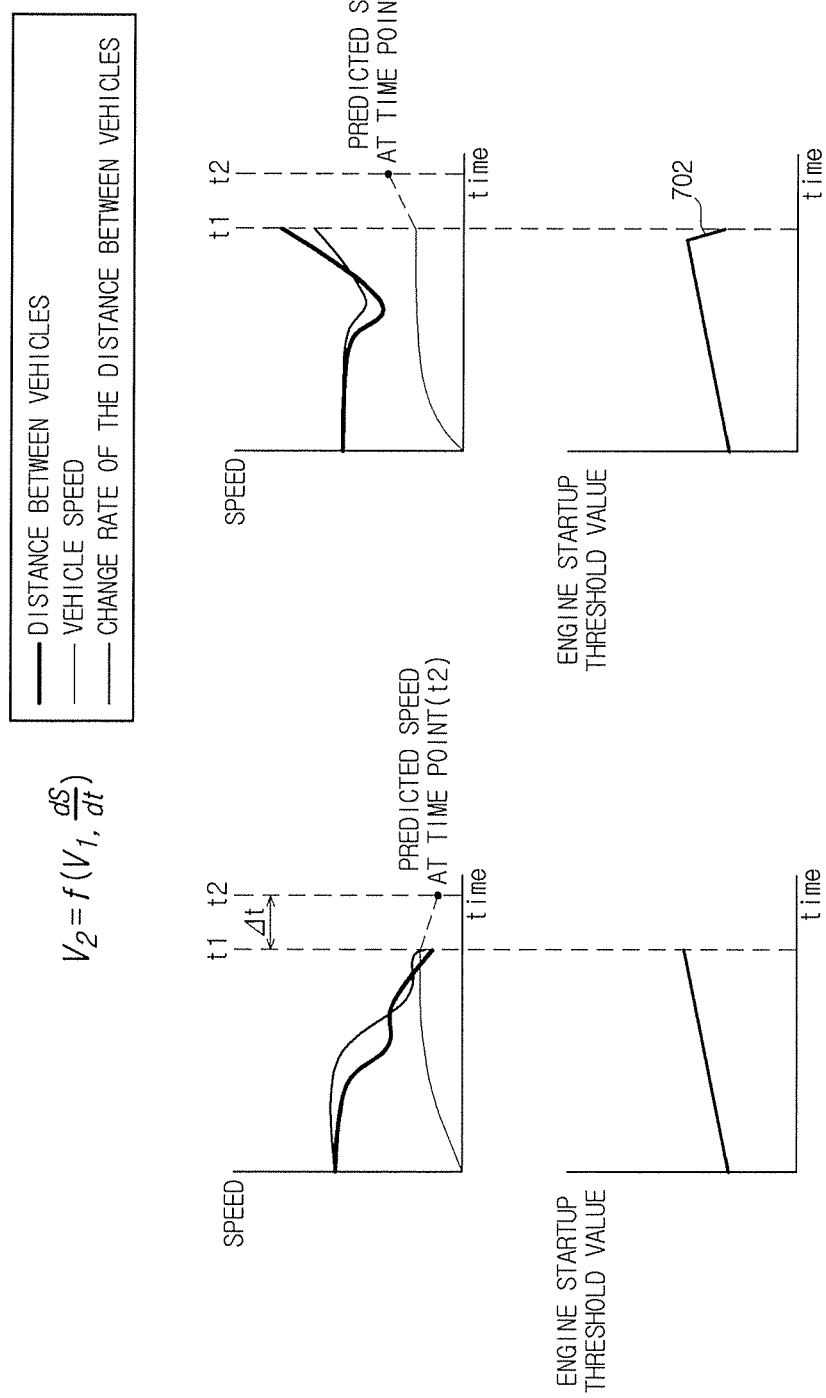

FIG. 9

| ΔV \ V1 | 0 | 3 | 6 | 9 | 12 | ... |
|---|---|---|---|---|---|---|
| ... | ... | ... | ... | ... | ... | ... |
| −3 | 1 | 1 | 1 | 1 | 1 | ... |
| 0 | 1 | 1 | 1 | 1 | 1 | ... |
| 3 | 1 | 0.8 | 0.7 | 0.6 | 0.6 | ... |
| 6 | 1 | 0.6 | 0.4 | 0.3 | 0.3 | ... |
| 9 | 0.5 | 0.3 | 0.2 | 0.2 | 0.2 | ... |
| ... | ... | ... | ... | ... | ... | ... |

US 10,737,683 B2

HYBRID VEHICLE AND METHOD FOR CONTROLLING THE SAME

CROSS-REFERENCE TO RELATED APPLICATION

This application claims the benefit of priority to Korean Patent Application No. 10-2017-0082347, filed on Jun. 29, 2017 in the Korean Intellectual Property Office, the disclosure of which is incorporated herein by reference.

TECHNICAL FIELD

The present disclosure relates to a vehicle, and more particularly, to a hybrid vehicle using a motor power and an engine power.

BACKGROUND

A hybrid vehicle acting as one of eco-friendly vehicles includes both a motor and an engine. The hybrid vehicle may selectively use a motor power or an engine power according to a vehicle traveling environment, or may use both motor power and engine power. If the hybrid vehicle is able to travel on the road only using power of the motor, only the motor is driven. If the hybrid vehicle further requires engine power, the motor and the engine can be simultaneously driven.

It takes a few minutes until the engine starts operation and has enough power to operate. Therefore, assuming that the hybrid vehicle requires high power before expiration of the engine driving, battery power consumption considerably increases due to overload of the motor. Such battery power consumption is considered undesirable from the viewpoint of efficient power management of the battery.

SUMMARY

An aspect of the present disclosure provides a hybrid vehicle having a motor and an engine, which efficiently controls a startup time point of the engine when power of the engine is needed, and reduces overload of the motor and a battery such that the hybrid vehicle can be efficiently driven.

Additional aspects of the invention will be set forth in part in the description which follows and, in part, will be obvious from the description, or may be learned by practice of the invention.

In accordance with an aspect of the present disclosure, a method for controlling a hybrid vehicle having a motor and an engine includes: calculating a first startup reference value of the engine on the basis of requested power of the hybrid vehicle; measuring a current speed of the hybrid vehicle, and predicting a future speed of the hybrid vehicle; generating a compensation value needed to compensate for the first startup reference value of the engine on the basis of a difference between the current speed and the future speed of the hybrid vehicle; acquiring a second startup reference value of the engine by compensating for the first startup reference value on the basis of the compensation value; and controlling a startup operation of the engine according to the second startup reference value acquired through compensation.

The method may further include: when the requested power is higher than the second startup reference value, driving both the motor and the engine; and when the requested power is equal to or less than the second startup reference value, driving only the motor.

The method may further include: calculating the future speed on the basis of a change rate of a rotation speed of the motor.

The method may further include: calculating the future speed using a following equation 1, $$N_{mot,t2} = N_{mot,t1} + \frac{dN}{dt} * \Delta t \quad V_2 = N_{mot,t2} * \text{gear ratio} \quad \text{[Equation 1]}$$

where, $N_{mot,t2}$ is a rotation speed of the motor at a future time, $N_{mot,t1}$ is a rotation speed of the motor at a current time, dN/dt is a change rate of the rotation speed of the motor, 't' is a difference between the current time and the future time, and $V_2$ is a future speed at the future time.

The method may further include: calculating the future speed on the basis of a change rate of power of the motor.

The method may further include: calculating the future speed using a following equation 2.

$$V_2 = f\left(V_1, \frac{dP}{dt}\right) \quad \text{[Equation 2]}$$

where, $V_1$ is a current speed of the hybrid vehicle, dP/dt is a change rate of the power of the motor, and $V_2$ is a future speed at the future time.

The power may be identical to the requested power.

The method may further include: calculating the future speed on the basis of a change rate of a distance between the hybrid vehicle and another vehicle located in a forward region.

The method may further include: calculating the future speed using a following equation 3, $$V_2 = f\left(V_1, \frac{dS}{dt}\right) \quad \text{[Equation 3]}$$

where, $V_1$ is a current speed of the hybrid vehicle, dS/dt is a change rate of the distance between the vehicles, $V_2$ is a future speed at the future time, and S is the distance between the vehicles.

The method may further include: calculating the future speed by reflecting at least one of a State of Charge (SoC) of a battery, an available power of the battery, an available power of the motor, a traveling environment of a road on which the hybrid vehicle travels, and cooling/heating load of an air conditioner.

In accordance with another aspect of the present disclosure, a hybrid vehicle includes: a motor; an engine; and a controller configured to calculate a first startup reference value of the engine on the basis of requested power of the hybrid vehicle, measure a current speed of the hybrid vehicle and predict a future speed of the hybrid vehicle, generate a compensation value needed to compensate for the first startup reference value of the engine on the basis of a difference between the current speed and the future speed of the hybrid vehicle, acquire a second startup reference value of the engine by compensating for the first startup reference value on the basis of the compensation value, and control a startup operation of the engine according to the second startup reference value acquired through compensation.

When the requested power is higher than the second startup reference value, the controller may drive both the motor and the engine. When the requested power is equal to or less than the second startup reference value, the controller may drive only the motor.

The controller may calculate the future speed on the basis of a change rate of a rotation speed of the motor.

The controller may calculate the future speed using a following equation 1, $$N_{mot,t2} = N_{mot,t1} + \frac{dN}{dt} * \Delta t \quad V_2 = N_{mot,t2} * \text{gear ratio} \quad \text{[Equation 1]}$$

where, $N_{mot,t2}$ is a rotation speed of the motor at a future time, $N_{mot,t1}$ is a rotation speed of the motor at a current time, dN/dt is a change rate of the rotation speed of the motor, 't' is a difference between the current time and the future time, and $V_2$ is a future speed at the future time.

The controller may calculate the future speed on the basis of a change rate of power of the motor.

The controller may calculate the future speed using a following equation 2.

$$V_2 = f\left(V_1, \frac{dP}{dt}\right) \quad \text{[Equation 2]}$$

where, $V_1$ is a current speed of the hybrid vehicle, dP/dt is a change rate of the power of the motor, and $V_2$ is a future speed at the future time.

The power may be identical to the requested power.

The controller may calculate the future speed on the basis of a change rate of a distance between the hybrid vehicle and another vehicle located in a forward region.

The controller may calculate the future speed using a following equation 3, $$V_2 = f\left(V_1, \frac{dS}{dt}\right) \quad \text{[Equation 3]}$$

where, $V_1$ is a current speed of the hybrid vehicle, dS/dt is a change rate of the distance between the vehicles, $V_2$ is a future speed at the future time, and S is the distance between the vehicles.

The controller may calculate the future speed by reflecting at least one of a State of Charge (SoC) of a battery, an available power of the battery, an available power of the motor, a traveling environment of a road on which the hybrid vehicle travels, and cooling/heating load of an air conditioner.

In accordance with another aspect of the present disclosure, a method for controlling a hybrid vehicle having a motor and an engine includes: calculating a first startup reference value of the engine on the basis of requested power of the hybrid vehicle; measuring a current speed of the hybrid vehicle, and predicting a future speed of the hybrid vehicle; generating a compensation value needed to compensate for the first startup reference value of the engine on the basis of a difference between the current speed and the future speed of the hybrid vehicle; acquiring a second startup reference value of the engine by compensating for the first startup reference value on the basis of the compensation value; and controlling a startup operation of the engine according to the second startup reference value acquired through compensation. When the requested power is higher than the second startup reference value, driving both the motor and the engine; and when the requested power is equal to or less than the second startup reference value, driving only the motor.

In accordance with another aspect of the present disclosure, a hybrid vehicle includes: a motor; an engine; and a controller configured to calculate a first startup reference value of the engine on the basis of requested power of the hybrid vehicle, measure a current speed of the hybrid vehicle and predict a future speed of the hybrid vehicle, generate a compensation value needed to compensate for the first startup reference value of the engine on the basis of a difference between the current speed and the future speed of the hybrid vehicle, acquire a second startup reference value of the engine by compensating for the first startup reference value on the basis of the compensation value, and control a startup operation of the engine according to the second startup reference value acquired through compensation. When the requested power is higher than the second startup reference value, the controller drives both the motor and the engine; and when the requested power is equal to or less than the second startup reference value, the controller drives only the motor.

BRIEF DESCRIPTION OF THE DRAWINGS

These and/or other aspects of the invention will become apparent and more readily appreciated from the following description of the embodiments, taken in conjunction with the accompanying drawings of which:

FIGS. 5A and 5B are conceptual diagrams illustrating a method for predicting a future speed of a hybrid vehicle according to an embodiment of the present disclosure.

FIGS. 6A and 6B are conceptual diagrams illustrating another method for predicting a future speed of a hybrid vehicle according to an embodiment of the present disclosure.

FIGS. 7A and 7B are conceptual diagrams illustrating a still another method for predicting a future speed of a hybrid vehicle according to an embodiment of the present disclosure.

FIG. 9 is a conceptual diagram illustrating a method for determining a compensation value (CP) on the basis of the relationship between a current speed and a future speed of a hybrid vehicle according to an embodiment of the present disclosure.

DETAILED DESCRIPTION

Figure 1:
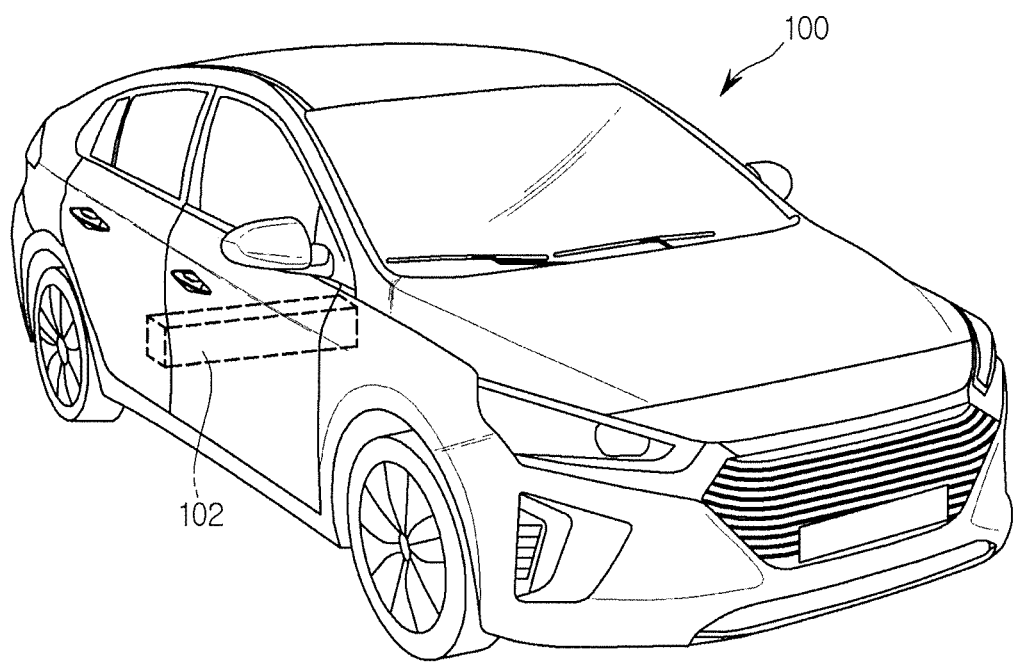
FIG. 1 is a view illustrating a vehicle according to an embodiment of the present disclosure.

Reference will now be made in detail to the embodiments of the present disclosure, examples of which are illustrated in the accompanying drawings, wherein like reference numerals refer to like elements throughout.

FIG. 1 is a view illustrating a hybrid vehicle according to an embodiment of the present disclosure.

Referring to FIG. 1, a hybrid vehicle 100 may include an internal combustion engine and an electric motor. Since the hybrid vehicle 100 includes a motor (see FIG. 2), a battery 102 for storing power needed to drive the motor is needed. A large-sized high-capacity battery is needed for the hybrid vehicle 100 whereas the battery 102 is provided at one side of an engine compartment of a general internal combustion vehicle. In the hybrid vehicle 100 according to the present disclosure, the battery 102 is installed at a lower space of a rear passenger seat at which a relatively larger-sized space can be guaranteed as compared to an engine compartment.

Figure 2:
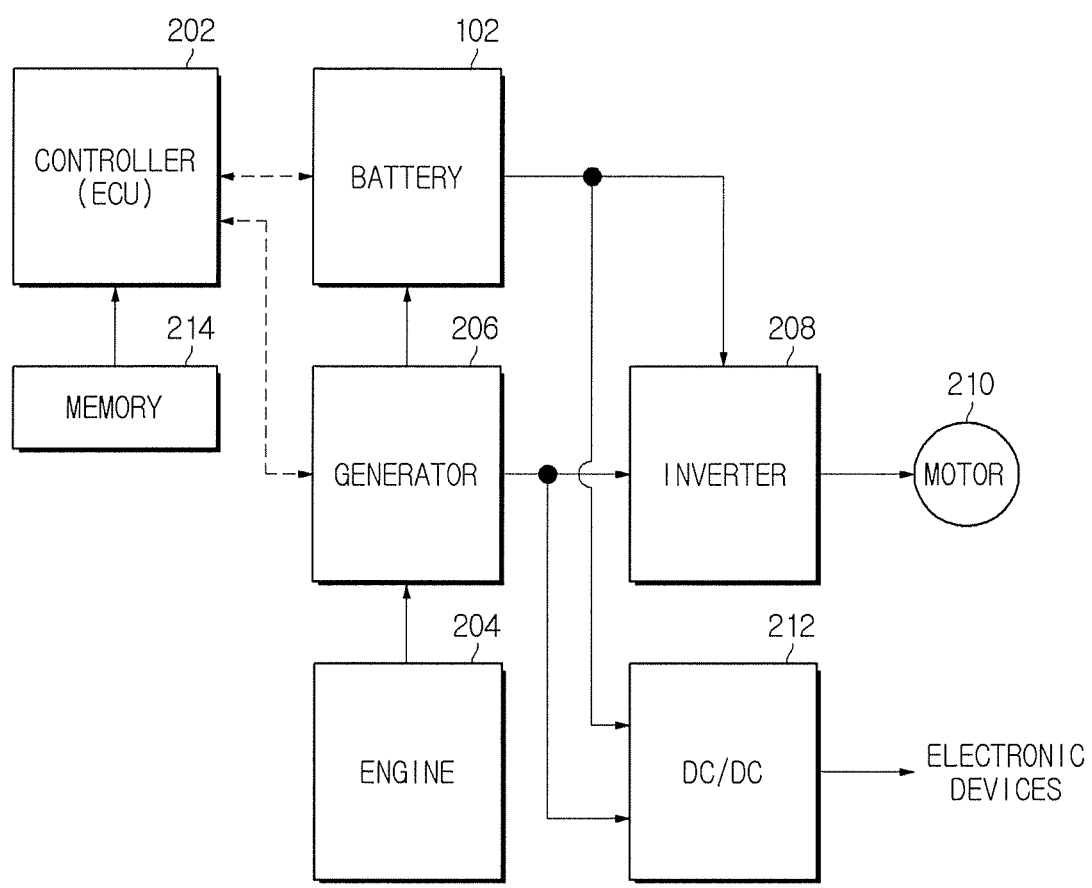
FIG. 2 is a view illustrating a power system of a vehicle according to an embodiment of the present disclosure.

Power stored in the battery 102 may be used to generate power by driving the motor (see FIG. 2). The battery 102 according to the present disclosure may be a lithium battery.

FIG. 2 is a view illustrating a power system of a vehicle according to an embodiment of the present disclosure.

Referring to FIG. 2, an electronic control unit (ECU) 202 may be a controller for overall operation of the power system. The ECU 202 may be a controller of a battery management system (BMS) configured to control/manage charging and discharging of the battery 102.

In FIG. 2, dotted arrows among the ECU 202, the battery 102, and the generator 206 may illustrate flows of a control signal transmitted over a CAN communication network, and solid arrows may illustrate flows of electric power.

The engine 204 may generate power by burning fuel such as gasoline and/or diesel.

The generator 206 may be connected to an output shaft, may use power generated from the engine 204, and may generate electricity, thereby generating power.

The battery 102 may store power generated by the generator 206. Power stored in the battery 102 may be used as drive energy of the motor 210 to be described later.

An inverter 208 may convert a voltage of the battery 102 into multiphase AC power (also called polyphase AC power) (for example, 3-phase (composed of U-phase, V-phase, and W-phase) AC power) upon receiving a control signal from a drive part (not shown), and may provide the multiphase AC power to the motor 210.

The motor 210 may be driven by 3-phase AC power of the inverter 208, and may thus generate power (rotational force). The rotational force of the motor 210 may be used to rotate wheels of the vehicle 100.

A DC/DC converter 212 may boost DC power received from the battery 102 or the generator 206 to a predetermined voltage level. DC power generated from the DC/DC converter 212 may be applied to various electronic devices embedded in the vehicle 100.

A memory 214 may store data or software/firmware needed for ECU control.

Figure 3:
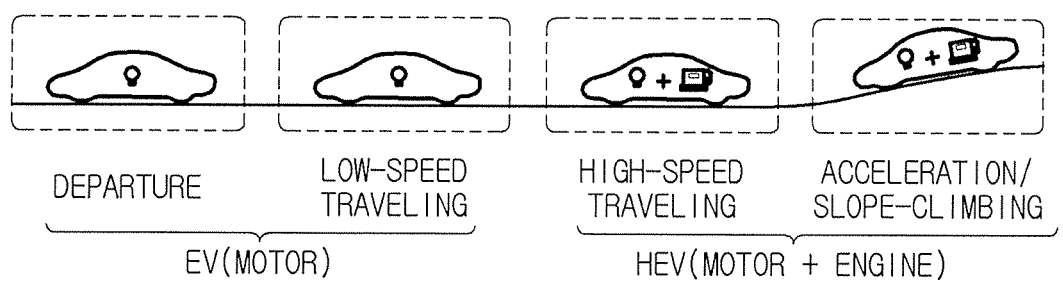
FIG. 3 is a view illustrating a traveling mode of a hybrid vehicle according to an embodiment of the present disclosure.

FIG. 3 is a view illustrating a traveling mode of the hybrid vehicle according to an embodiment of the present disclosure.

Referring to FIG. 3, the traveling mode of the hybrid vehicle 100 may be classified into an EV traveling mode in which the hybrid vehicle 100 travels using only the driving power of the motor 210 and an HEV traveling mode in which the hybrid vehicle 100 travels using both the driving power of the motor 210 and the driving power of the engine 204.

The EV traveling mode of the hybrid vehicle 100 may include a departure mode and a low-speed traveling mode. In the departure mode, the hybrid vehicle 100 may switch from a stopped state to a start driving state for vehicle traveling. In the low-speed traveling mode, the hybrid vehicle 100 may travel at a relatively low speed. If the hybrid vehicle 100 is in the departure mode or the low-speed traveling mode, the hybrid vehicle 100 can be driven even at a relatively low-capacity power, such that the hybrid vehicle 100 uses only power of the motor 210 without using power of the engine 204. However, if the hybrid vehicle 100 is in the HEV traveling mode, the hybrid vehicle 100 may temporarily use only power of the engine 204 without using power of the motor 210 as necessary.

The HEV traveling mode of the hybrid vehicle 100 may include a high-speed traveling mode and an acceleration/slope-climbing mode. In the high-speed traveling mode, the hybrid vehicle 100 may travel at a relatively high speed. In the acceleration/slope-climbing mode, the hybrid vehicle 100 may gradually increase in speed (accelerate) and may climb up a slope. If the hybrid vehicle 100 is in the high-speed traveling mode or the acceleration/slope-climbing mode, the hybrid vehicle 100 can be driven even at a relatively high-capacity power, such that the hybrid vehicle 100 uses both power of the motor 210 and power of the engine 204.

The departure mode may be defined as a predetermined time in which the hybrid vehicle 100 awakes from the stopped state and then reaches a predetermined speed (e.g., 25 km/h). A reference speed for discriminating between the low-speed traveling mode and the high-speed traveling mode may be changed according to specifications of the hybrid vehicle 100. For example, a maximum speed capable of being acquired from only power of the motor 210 may be defined as a reference speed, such that a speed less than the reference speed may be defined as a low speed and a speed equal to or higher than the reference speed may be defined as a high speed. Assuming that a maximum speed capable of being acquired from only power of the motor 210 is 60 km/h, a traveling mode having a speed less than 60 km/h may be defined as a low-speed traveling mode, and a traveling mode having a speed equal to or higher than 60 km/h may be defined as a high-speed traveling mode.

The acceleration/slope-climbing mode may be defined as an operation mode in which acceleration of the hybrid vehicle 100 is higher than a predetermined value (i.e., acceleration state) and the hybrid vehicle 100 climbs up a slope having a predetermined angle or greater (i.e., hill climbing state).

As previously stated above, the hybrid vehicle 100 may travel only using the driving power of the motor 210 during the EV traveling mode, and may travel using both the driving power of the motor 210 and the driving power of the engine 204 during the HEV traveling mode. Therefore, when the hybrid vehicle 100 switches from the EV traveling mode to the HEV traveling mode, the engine 204 starts running. Assuming that a predetermined time in which the engine 204 starts driving and generates necessary power having a predetermined level or greater is defined as a startup time, a short startup time may be unavoidably encountered due to unique characteristics of the engine 204. When the hybrid vehicle 100 switches from the EV traveling mode to the HEV traveling mode, the hybrid vehicle 100 may adjust a startup time point in consideration of the operation time of the engine 204, such that necessary power having a predetermined level or greater is acquired from the engine 204 at a necessary time point and is then efficiently used as necessary.

Figure 4:
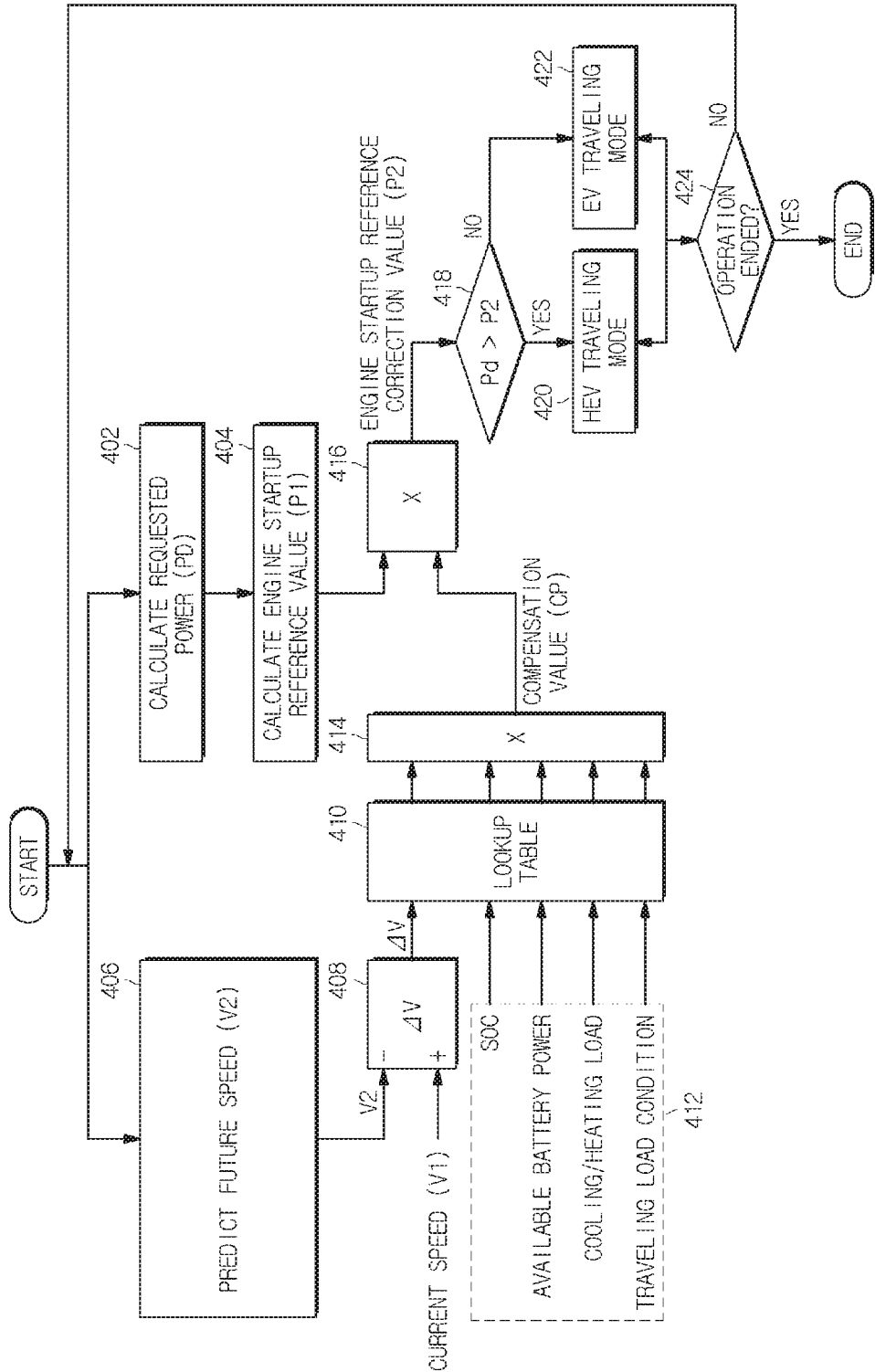
FIG. 4 is a flowchart illustrating a method for controlling traveling mode switching of a hybrid vehicle according to an embodiment of the present disclosure.

FIG. 4 is a flowchart illustrating a method for controlling traveling mode switching of a hybrid vehicle according to an embodiment of the present disclosure. The method for controlling traveling mode switching of the hybrid vehicle may properly control the startup time point of the engine 204 when the EV traveling mode is switched to the HEV traveling mode.

The controller 202 may calculate a requested power (Pd) of the hybrid vehicle (Operation 402). The requested power (Pd) may be requested for traveling of the hybrid vehicle 100. If the requested power (Pd) is relatively low, power of the motor 210 may be used. If the requested power (Pd) is relatively high, power of the engine 204 may be used. If the requested power (Pd) is very high, both the power of the engine 204 and the power of the motor 210 may be simultaneously used.

The controller 202 may calculate an engine startup reference value (P1) by referring to the requested power (Pd) (Operation 404). That is, the controller 202 may calculate a reference value (i.e., the engine startup reference value P1) for determining a specific time point at which the engine 204 starts operation, on the basis of the requested power (Pd) needed for traveling of the hybrid vehicle 100. A basic startup time point of the engine 204 may be based on the engine startup reference value (P1). However, as will be described later, the hybrid vehicle 100 according to the embodiment of the present disclosure may more precisely control the startup time point of the engine 204 by compensating for the engine startup reference value (P1) through the compensation value (CP) needed to more accurately control the startup time point of the engine 204.

The controller 202 may predict a future speed ($V_2$) of the hybrid vehicle 100 (Operation 406). That is, the controller 202 may predict the future speed ($V_2$) of the hybrid vehicle 100 after lapse of a predetermined time (e.g., 2 or 3 seconds) from a current time point on the basis of a current traveling state (current traveling condition) of the hybrid vehicle 100.

The controller 202 may compare a current speed ($V_1$) of the hybrid vehicle 100 with the future speed ($V_2$) of the hybrid vehicle 100, and may calculate a difference ($\Delta V$) between the current speed ($V_1$) and the future speed ($V_2$) (Operation 408). The controller 202 may generate the compensation value (CP) on the basis of the speed difference ($\Delta V$). The compensation value (CP) may be used to generate an engine startup reference correction value (P2) to be described in operation 416.

In order to generate the compensation value (CP), the controller 202 may compare the speed difference ($\Delta V$) with data of a lookup table 410. The lookup table 410 may store data regarding the compensation value (CP) appropriate for the difference ($\Delta V$) between the current speed ($V_1$) and the future speed ($V_2$) of the hybrid vehicle 100. Therefore, the controller 202 may calculate the compensation value (CP) appropriate for the difference ($\Delta V$) between the current speed ($V_1$) and the future speed ($V_2$) of the hybrid vehicle 100 by referring to the lookup table 410.

The controller 202 may use an additional reference 412 for calculating the appropriate compensation value (CP). That is, the controller 202 may calculate the compensation value (CP) on the basis of various additional references 412, for example, a State of Charge (SoC) of the battery 102, an available lifespan of the battery 102, cooling/heating load of the air conditioner, a condition of the road on which the hybrid vehicle 100 travels, etc. The additional references 412 are not limited thereto, and many more references may also be used to acquire the appropriate compensation value (CP) as necessary. The additional reference 412 may also be used to acquire the appropriate compensation value (CP) by referring to the lookup table 410.

Not only the difference ($\Delta V$) between the current speed ($V_1$) and the future speed ($V_2$) of the hybrid vehicle 100, but also the additional references 412 are further used, all lookup-table values corresponding to all the used references may be accumulated by the accumulator 414, thereby generating the compensation value (CP).

The compensation value (CP) may be used to generate the engine startup reference correction value (P2) as described above. That is, the controller 202 may accumulate the engine startup reference value (P1) acquired from Operation 404 and the compensation value (CP) acquired from Operation 414 using the accumulator 416, thereby generating the engine startup reference correction value (P2). The compensation value (CP) may be generated on the basis of various references including the difference ($\Delta V$) between the current speed ($V_1$) and the future speed ($V_2$) of the hybrid vehicle 100, and the engine startup reference correction value (P2) may be generated by properly correcting the engine startup reference value (P1) using the compensation value (CP). Not only information regarding the presence or absence of the startup operation of the engine 204 of the hybrid vehicle 100, but also the startup time point of the engine 204 may be decided by the engine startup reference correction value (P2). For example, if there is a large difference ($\Delta V$) between the current speed ($V_1$) and the future speed ($V_2$) of the hybrid vehicle 100, high power is needed in future. In this case, a relatively low compensation value (CP) is generated such that the engine startup reference value (P2) is reduced. As a result, the startup time point of the engine 204 may be located ahead of the engine startup reference value (P1), such that the startup time point of the engine 204 moves forward. If the engine 204 starts the startup operation at an earlier time, this means that the startup operation of the engine 202 is performed in advance such that sufficient power can be acquired from the completely driven engine 204 at the future time at which power of the engine 204 is needed.

From this point of view, the controller 202 may compare the requested power (Pd) with the engine startup reference correction value (P2) in a manner that the hybrid vehicle 100 travels in any one of the HEV traveling mode and the EV traveling mode (Operation 418).

If the requested power (Pd) is higher than the engine startup reference correction value (P2) (i.e., Pd>P2) (Operation 418), the controller 202 may control the hybrid vehicle 100 to travel in the HEV traveling mode in which both the engine 204 and the motor 210 are simultaneously driven (Operation 420). In this case, the engine startup reference correction value (P2) in which the compensation value (CP) is reflected moves forward such that sufficient power from the engine 204 may be used in future.

On the other hand, if the requested power (Pd) is equal to or less than the engine startup reference correction value (P2) (i.e., Pd≤P2) (Operation 418), the controller 202 may control the hybrid vehicle 100 to travel in the EV traveling mode in which only the motor 210 is driven (Operation 422). Since the hybrid vehicle 100 uses only the power of the motor 210 during the EV traveling mode, the engine 204 need not be driven. If the hybrid vehicle 100 is continuously driven (Operation 424), the controller 202 may return to operations 402 and 406.

FIGS. 5A and 5B are conceptual diagrams illustrating a method for predicting a future speed of the hybrid vehicle according to an embodiment of the present disclosure. Referring to FIGS. 5A and 5B, the controller 202 may predict a speed (i.e., the future speed $V_2$) at a specific future time (t2) of the hybrid vehicle 100 as represented by the following equation 1, and may control the startup time point of the engine 204.

The controller 202 may predict the future speed V2 at the future time (t2) on the basis of the change rate of the speed of the motor 210 at the current time (t1), as represented by the following equation 1.

$$N_{mot,t2} = N_{mot,t1} + \frac{dN}{dt} * \Delta t \quad V_2 = N_{mot,t2} * \text{gear ratio} \quad \text{[Equation 1]}$$

where, $N_{mot,t2}$ is a rotation speed (predicted value) of the motor 210 at the future time (t2), $N_{mot,t1}$ is a rotation speed (measurement value) of the motor 210 at the current time (t1), dN/dt is the change rate of the rotation speed of the motor 210, 't' is a difference between the current time (t1) and the future time (t2), and V2 is a future speed (predicted value) at the future time (t2).

In Equation 1, the rotation speed ($N_{mot,t1}$) of the motor 210 at the current time (t1) is added to the product of the change rate of the rotation speed of the motor 210 and the time difference (t), such that a rotation speed ($N_{mot,t2}$) of the motor 210 at the future time (t2) is acquired. A gear ratio of a gearbox is reflected in the rotation speed ($N_{mot,t2}$) of the motor 210 at the future time (t2), resulting in prediction of the future speed ($V_2$) at the future time (t2).

FIG. 5A illustrates an example in which there is a relatively little difference between the current speed ($V_1$) at the current time (t1) and the future speed ($V_2$) at the future time (t2). Referring to FIG. 5A, if it is expected that the speed of the hybrid vehicle 100 will gradually increase, the controller 202 may not move the startup time point of the engine 204 forward, and may apply the engine startup reference value (P1) in which the compensation value (CP) is not reflected without change, thereby controlling the startup time point of the engine 204.

Differently from FIG. 5A, FIG. 5B illustrates an example in which there is a relatively large difference between the current speed ($V_1$) at the current time (t1) and the future speed ($V_2$) at the future time (t2). Referring to FIG. 5B, if it is expected that the speed of the hybrid vehicle 100 will abruptly increase, the controller 202 may reduce the engine startup reference correction value (P2) on the basis of the compensation value (CP) as shown in 502 of FIG. 5B, such that the startup time point of the engine 204 moves forward as compared to FIG. 5A. As a result, the startup time point of the engine 204 moves forward such that sufficient power may be acquired from the completely driven engine 204 at the future time (t2).

FIGS. 6A and 6B are conceptual diagrams illustrating yet another method for predicting a future speed of a hybrid vehicle according to an embodiment of the present disclosure. Referring to FIGS. 6A and 6B, the controller 202 may predict a speed (i.e., the future speed $V_2$) at a specific future time (t2) of the hybrid vehicle 100 as represented by the following equation 2, and may control the startup time point of the engine 204.

The controller 202 may predict the future speed $V_2$ at the future time (t2) on the basis of the change rate of the power P of the motor 210, as represented by the following equation 2.

$$V_2 = f\left(V_1, \frac{dP}{dt}\right) \quad \text{[Equation 2]}$$

In Equation 2, $V_1$ is a current speed of the hybrid vehicle 100, dP/dt is the change rate of the power P of the motor 210, and $V_2$ is a future speed (predicted value) at the future time (t2).

As can be seen from Equation 2, the current speed ($V_1$) of the hybrid vehicle 100 and the power change rate (dP/dt) of the motor 210 are applied to a predetermined function, resulting in prediction of the future speed ($V_2$). That is, the relationship between the power change rate and the speed change rate in the motor 210 may be confirmed through experimentation, and the experimental result is configured in the form of a database (DB), resulting in formation of the lookup table 410. The controller 202 may predict the future speed ($V_2$) at the future time (t2) of the hybrid vehicle 100 on the basis of the power change rate of the motor 210 by referring to the lookup table 410.

FIG. 6A illustrates an example in which there is a relatively little difference between the current speed ($V_1$) at the current time (t1) and the future speed ($V_2$) at the future time (t2). Referring to FIG. 6A, if it is expected that the speed of the hybrid vehicle 100 will gradually increase, the controller 202 may not move the startup time point of the engine 204 forward, and may apply the engine startup reference value (P1) in which the compensation value (CP) is not reflected without change, thereby controlling the startup time point of the engine 204.

Differently from FIG. 6A, FIG. 6B illustrates an example in which there is a relatively large difference between the current speed ($V_1$) at the current time (t1) and the future speed ($V_2$) at the future time (t2). Referring to FIG. 6B, if it is expected that the speed of the hybrid vehicle 100 will abruptly increase, the controller 202 may reduce the engine startup reference correction value (P2) by reflecting the compensation value (CP) as shown in 602 of FIG. 6B, such that the startup time point of the engine 204 moves forward as compared to FIG. 6A. As a result, the startup time point of the engine 204 moves forward such that sufficient power may be acquired from the completely driven engine 204 at the future time (t2).

FIGS. 7A and 7B are conceptual diagrams illustrating a still another method for predicting a future speed of a hybrid vehicle according to an embodiment of the present disclosure. Referring to FIGS. 7A and 7B, the controller 202 may predict a speed (i.e., the future speed $V_2$) at a specific future time (t2) of the hybrid vehicle 100 as represented by the following equation 3, and may control the startup time point of the engine 204.

The controller 202 may predict the future speed $V_2$ at the future time (t2) on the basis of the change rate of the distance S (i.e., distance between the vehicles) between the hybrid vehicle 100 and a front vehicle located in a forward region, as represented by the following equation 3.

$$V_2 = f\left(V_1, \frac{dS}{dt}\right) \quad \text{[Equation 3]}$$

In Equation 3, $V_1$ is a current speed of the hybrid vehicle 100, dS/dt is the change rate of a distance S between the vehicles, $V_2$ is a future speed (predicted value) at the future time (t2), and S is the distance S between the vehicles (i.e., an inter-vehicle distance S).

As can be seen from Equation 3, the current speed ($V_1$) of the hybrid vehicle 100 and the inter-vehicle distance change rate (dS/dt) of the motor 210 are applied to a predetermined function, resulting in prediction of the future speed ($V_2$).

That is, if the change rate of the distance between the vehicles is gradually increasing, the speed of the hybrid vehicle 100 is also increasing (see FIG. 7A). If the change rate of the distance between the vehicles is gradually decreasing, the speed of the hybrid vehicle 100 is also decreasing (see FIG. 7B). The relationship between FIG. 7A and FIG. 7B is configured in the form of a database (DB), resulting in formation of the lookup table 410. The controller 202 may predict the future speed ($V_2$) at the future time (t2) of the hybrid vehicle 100 on the basis of the change rate of the distance between the vehicles by referring to the lookup table 410.

FIG. 7A illustrates an example in which there is a relatively little difference between the current speed ($V_1$) at the current time (t1) and the future speed ($V_2$) at the future time (t2). Referring to FIG. 7A, if it is expected that the speed of the hybrid vehicle 100 will gradually increase, the controller 202 may not move the startup time point of the engine 204 forward, and may apply the engine startup reference value (P1) in which the compensation value (CP) is not reflected without change, thereby controlling the startup time point of the engine 204.

Differently from FIG. 7A, FIG. 7B illustrates an example in which there is a relatively large difference between the current speed ($V_1$) at the current time (t1) and the future speed ($V_2$) at the future time (t2). Referring to FIG. 7B, if it is expected that the speed of the hybrid vehicle 100 will abruptly increase, the controller 202 may reduce the engine startup reference correction value (P2) by reflecting the compensation value (CP) as shown in 702 of FIG. 7B, such that the startup time point of the engine 204 moves forward as compared to FIG. 7A. As a result, the startup time point of the engine 204 moves forward such that sufficient power may be acquired from the completely driven engine 204 at the future time (t2).

FIGS. 8A-8F illustrates various methods for determining a compensation value (CP) needed to compensate for an engine start reference value of the hybrid vehicle according to an embodiment of the present disclosure.

Figure 8A:
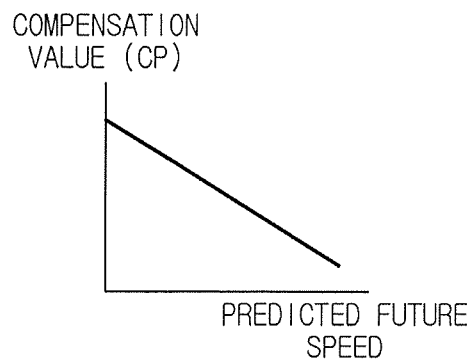
FIGS. 8A-8F illustrate various methods for determining a compensation value (CP) needed to compensate for an engine start reference value of the hybrid vehicle according to an embodiment of the present disclosure.

FIG. 8A is a conceptual diagram illustrating a method for generating the compensation value (CP) by predicting the future speed ($V_2$) at the future time (t2) as described in FIGS. 5A and 5B. As can be seen from FIG. 8A, as the predicted future speed ($V_2$) gradually increases, the compensation value (CP) is gradually reduced and the engine startup reference correction value (P2) is also reduced, such that the startup time point of the engine 204 moves forward.

Figure 8B:
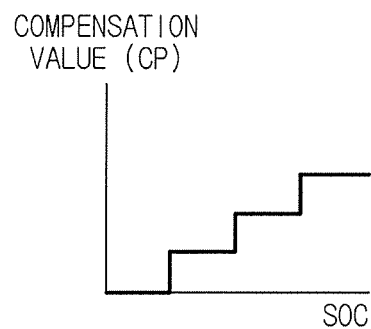

FIG. 8B is a conceptual diagram illustrating a method for generating the compensation value (CP) on the basis of the SOC of the battery 102. As can be seen from FIG. 8B, as the compensation value (CP) is gradually reduced, the engine startup reference correction value (P2) is also reduced, such that the startup time point of the engine 204 moves forward.

Figure 8C:
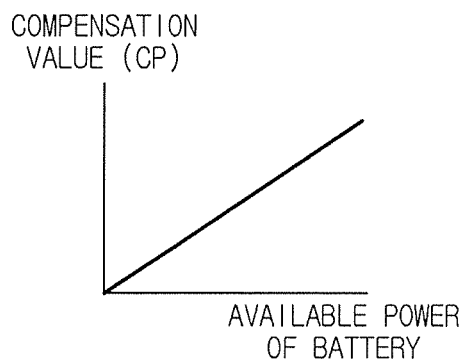

FIG. 8C is a conceptual diagram illustrating a method for generating the compensation value (CP) on the basis of available power of the battery 102. As can be seen from FIG. 8C, as the available power of the battery 102 is gradually reduced, load of the battery 102 is reduced and the compensation value (CP) is also reduced to further utilize the engine 204 in a manner that the engine startup reference correction value (P2) is reduced, such that the startup time point of the engine 204 moves forward.

Figure 8D:
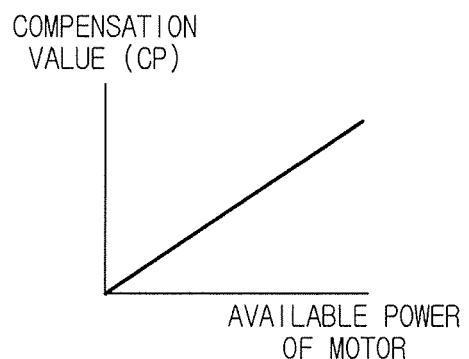

FIG. 8D is a conceptual diagram illustrating a method for generating the compensation value (CP) on the basis of available power of the battery 210. As can be seen from FIG. 8D, as the available power of the motor 210 is gradually reduced, load of the motor 210 is reduced and the compensation value (CP) is also reduced to further utilize the engine 204 in a manner that the engine startup reference correction value (P2) is reduced, such that the startup time point of the engine 204 moves forward.

Figure 8E:
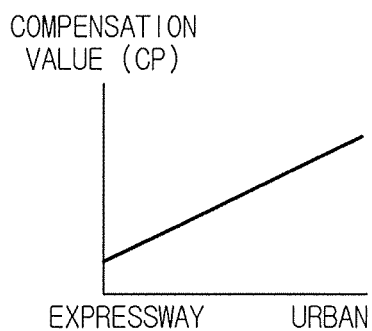

FIG. 8E is a conceptual diagram illustrating a method for generating the compensation value (CP) on the basis of the traveling environment of the hybrid vehicle 100. As can be seen from FIG. 8E, the compensation value (CP) is reduced on the road on which the hybrid vehicle 100 travels at a relatively high speed, and the engine startup reference correction value (P2) is reduced, such that the startup time point of the engine 204 moves forward.

Figure 8F:
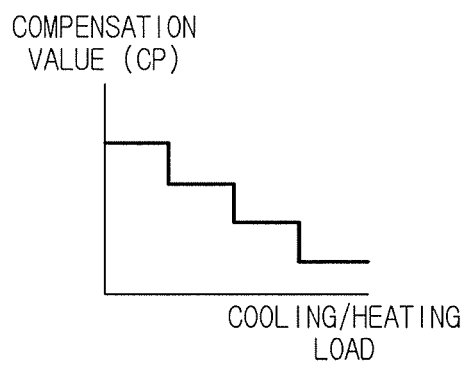

FIG. 8F is a conceptual diagram illustrating a method for generating the compensation value (CP) on the basis of cooling/heating load of the air conditioner of the hybrid vehicle 100. As can be seen from FIG. 8F, if the cooling/heating load is high, load of the motor 210 also increases. In order to reduce load of the motor 210 as well as to further utilize the engine 204, the compensation value (CP) is reduced and the engine startup reference correction value (P2) is also reduced, such that the startup time point of the engine 204 moves forward.

FIG. 9 is a conceptual diagram illustrating a method for determining a compensation value (CP) on the basis of the relationship between the current speed and the future speed of the hybrid vehicle according to an embodiment of the present disclosure. Referring to FIG. 9, as the difference ($\Delta V$) between the current speed ($V_1$) and the future speed ($V_2$) of the hybrid vehicle 100 gradually increases, the compensation value (CP) is set to a lower value. In addition, the compensation value (CP) may be adjusted in consideration of the current speed ($V_1$) of the hybrid vehicle 100. For example, assuming that the current speed ($V_1$) is 6 km/h, the engine startup reference value (P1) is 10 kW, and the future speed ($V_2$) after lapse of 3 seconds (at) is 12 km/h, the compensation value (CP) is set to 0.4, such that the engine startup reference correction value (P2) may be finally set to 4 kW (10 kw*0.4=4 kW). If the requested power (Pd) reaches 4 kW, the controller 202 drives the engine 204 and thus switches to the HEV traveling mode.

As is apparent from the above description, the hybrid vehicle having a motor and an engine according to the embodiments of the present disclosure may efficiently control a startup time point of the engine when power of the engine is needed, and may reduce overload of the motor and a battery such that the hybrid vehicle is efficiently driven.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. A method for controlling a hybrid vehicle having a motor and an engine comprising:
   calculating, by a controller, a first startup reference value of the engine based on a requested power of the hybrid vehicle;
   measuring, by the controller, a current speed of the hybrid vehicle, and predicting a future speed of the hybrid vehicle;
   generating, by the controller, a compensation value needed to compensate for the first startup reference value of the engine based on a difference between the current speed and the future speed of the hybrid vehicle;

acquiring, by the controller, a second startup reference value of the engine by compensating for the first startup reference value based on the compensation value; and controlling, by the controller, a startup operation of the engine according to the second startup reference value acquired through compensation.

2. The method according to claim 1, further comprising:
when the requested power is higher than the second startup reference value, driving both the motor and the engine; and
when the requested power is equal to or less than the second startup reference value, driving only the motor.

3. The method according to claim 1, further comprising:
calculating the future speed by applying a value representing at least one of a State of Charge (SoC) of a battery, an available power of the battery, an available power of the motor, a traveling environment of a road on which the hybrid vehicle travels, or a cooling/heating load of an air conditioner.

4. The method according to claim 1, further comprising:
calculating the future speed based on at least one of a change rate of a rotation speed of the motor and a change rate of power of the motor.

5. The method according to claim 4, further comprising:
calculating the future speed using the following equation, $$N_{mot,t2} = N_{mot,t1} + \frac{dN}{dt} * \Delta t \quad V_2 = N_{mot,t2} * \text{gear ratio},$$

wherein $N_{mot,t2}$ is a rotation speed of the motor at a future time, $N_{mot,t1}$ is a rotation speed of the motor at a current time, dN/dt is a change rate of the rotation speed of the motor, 't' is a difference between the current time and the future time, and $V_2$ is a future speed at the future time.

6. The method according to claim 4, further comprising:
calculating the future speed using the following equation, $$V_2 = f\left(V_1, \frac{dP}{dt}\right),$$

wherein $V_1$ is a current speed of the hybrid vehicle, dP/dt is a change rate of the power of the motor, and $V_2$ is a future speed at a future time.

7. The method according to claim 6, wherein the power of the motor is identical to the requested power.

8. The method according to claim 1, further comprising:
calculating the future speed based on a change rate of a distance between the hybrid vehicle and another vehicle located in a forward region.

9. The method according to claim 8, further comprising:
calculating the future speed using the following equation, $$V_2 = f\left(V_1, \frac{dS}{dt}\right),$$

wherein $V_1$ is a current speed of the hybrid vehicle, dS/dt is a change rate of the distance between the vehicles, $V_2$ is a future speed at a future time, and S is the distance between the vehicles.

10. A hybrid vehicle comprising:
a motor;
an engine; and
a controller configured to:
calculate a first startup reference value of the engine based on a requested power of the hybrid vehicle;
measure a current speed of the hybrid vehicle and predict a future speed of the hybrid vehicle;
generate a compensation value needed to compensate for the first startup reference value of the engine based on a difference between the current speed and the future speed of the hybrid vehicle;
acquire a second startup reference value of the engine by compensating for the first startup reference value based on the compensation value; and
control a startup operation of the engine according to the second startup reference value acquired through compensation.

11. The hybrid vehicle according to claim 10, wherein:
when the requested power is higher than the second startup reference value, the controller drives both the motor and the engine; and
when the requested power is equal to or less than the second startup reference value, the controller drives only the motor.

12. The hybrid vehicle according to claim 10, wherein the controller calculates the future speed by applying a value representing at least one of a State of Charge (SoC) of a battery, an available power of the battery, an available power of the motor, a traveling environment of a road on which the hybrid vehicle travels, or a cooling/heating load of an air conditioner.

13. The hybrid vehicle according to claim 10, wherein the controller calculates the future speed based on a change rate of a rotation speed of the motor.

14. The hybrid vehicle according to claim 13, wherein the controller calculates the future speed using the following equation, $$N_{mot,t2} = N_{mot,t1} + \frac{dN}{dt} * \Delta t \quad V_2 = N_{mot,t2} * \text{gear ratio},$$

wherein $N_{mot,t2}$ is a rotation speed of the motor at a future time, $N_{mot,t1}$ is a rotation speed of the motor at a current time, dN/dt is a change rate of the rotation speed of the motor, 't' is a difference between the current time and the future time, and $V_2$ is a future speed at the future time.

15. The hybrid vehicle according to claim 10, wherein the controller calculates the future speed based on a change rate of power of the motor.

16. The hybrid vehicle according to claim 15, wherein the controller calculates the future speed using the following equation, $$V_2 = f\left(V_1, \frac{dP}{dt}\right),$$

wherein $V_1$ is a current speed of the hybrid vehicle, dP/dt is a change rate of the power of the motor, and $V_2$ is a future speed at a future time, and
wherein the power of the motor is identical to the requested power.

17. The hybrid vehicle according to claim 10, wherein the controller calculates the future speed based on a change rate of a distance between the hybrid vehicle and another vehicle located in a forward region.

18. The hybrid vehicle according to claim 17, wherein the controller calculates the future speed using the following equation, $$V_2 = f\left(V_1, \frac{dS}{dt}\right),$$

wherein $V_1$ is a current speed of the hybrid vehicle, dS/dt is a change rate of the distance between the vehicles, $V_2$ is a future speed at a future time, and S is the distance between the vehicles.

19. A method for controlling a hybrid vehicle having a motor and an engine comprising:
- calculating, by a controller, a first startup reference value of the engine based on a requested power of the hybrid vehicle;
- measuring, by the controller, a current speed of the hybrid vehicle, and predicting a future speed of the hybrid vehicle;
- generating, by the controller, a compensation value needed to compensate for the first startup reference value of the engine based on a difference between the current speed and the future speed of the hybrid vehicle;
- acquiring, by the controller, a second startup reference value of the engine by compensating for the first startup reference value based on the compensation value; and
- controlling, by the controller, a startup operation of the engine according to the second startup reference value acquired through compensation,
- wherein when the requested power is higher than the second startup reference value, driving both the motor and the engine, and
- when the requested power is equal to or less than the second startup reference value, driving only the motor.

20. A hybrid vehicle comprising:
a motor;
an engine; and
a controller configured to:
- calculate a first startup reference value of the engine based on a requested power of the hybrid vehicle;
- measure a current speed of the hybrid vehicle and predict a future speed of the hybrid vehicle;
- generate a compensation value needed to compensate for the first startup reference value of the engine based on a difference between the current speed and the future speed of the hybrid vehicle;
- acquire a second startup reference value of the engine by compensating for the first startup reference value based on the compensation value; and
- control a startup operation of the engine according to the second startup reference value acquired through compensation,
- wherein when the requested power is higher than the second startup reference value, the controller drives both the motor and the engine, and
- when the requested power is equal to or less than the second startup reference value, the controller drives only the motor.

* * * * *